United States Patent

[11] 3,625,177

[72] Inventor Adam C. Miller
P.O. Box 1488, 1712 West McKinley, Phoenix, Ariz. 85001
[21] Appl. No. 62,409
[22] Filed Aug. 10, 1970
[45] Patented Dec. 7, 1971

[54] PORTABLE EMERGENCY WARNING APPARATUS
1 Claim, 7 Drawing Figs.

[52] U.S. Cl. .................................................. 116/63, 40/125 N
[51] Int. Cl. .................................................. E01f 9/10
[50] Field of Search .................................................. 116/63, 63 P; 40/125 I, 125 H, 125 J; 94/1.5; 340/114, 115, 116, 117, 119

[56] References Cited
FOREIGN PATENTS

| | | | |
|---|---|---|---|
| 495,840 | 6/1950 | Belgium | 116/63 |
| 1,052,406 | 12/1966 | Great Britain | 116/63 |
| 1,167,085 | 10/1969 | Great Britain | 116/63 |
| 1,169,589 | 11/1969 | Great Britain | 116/63 |
| 783,961 | 4/1968 | Canada | 116/63 |
| 1,242,732 | 8/1960 | France | 116/63 |
| 1,278,699 | 11/1961 | France | 116/63 |
| 1,375,342 | 9/1964 | France | 116/63 |
| 291,065 | 9/1953 | Switzerland | 116/63 |

*Primary Examiner*—Louis J. Capozi
*Attorney*—Duckworth and Hobby

ABSTRACT: A portable emergency warning apparatus is provided having a foldable triangular-shaped warning portion in which one side of the triangle has pads thereon to act as a portion of the base and a removable base member having a pair of feet attached between the ends of the side having pads thereon, whereby the base can be easily removed and the triangular portion folded for easy storage of the warning device. The base may be weighted and may have feet that are serrated to resist movement by wind being applied against the triangle and has means for steadying the triangular portion when assembled, and for locating the sides in a desired position when folded.

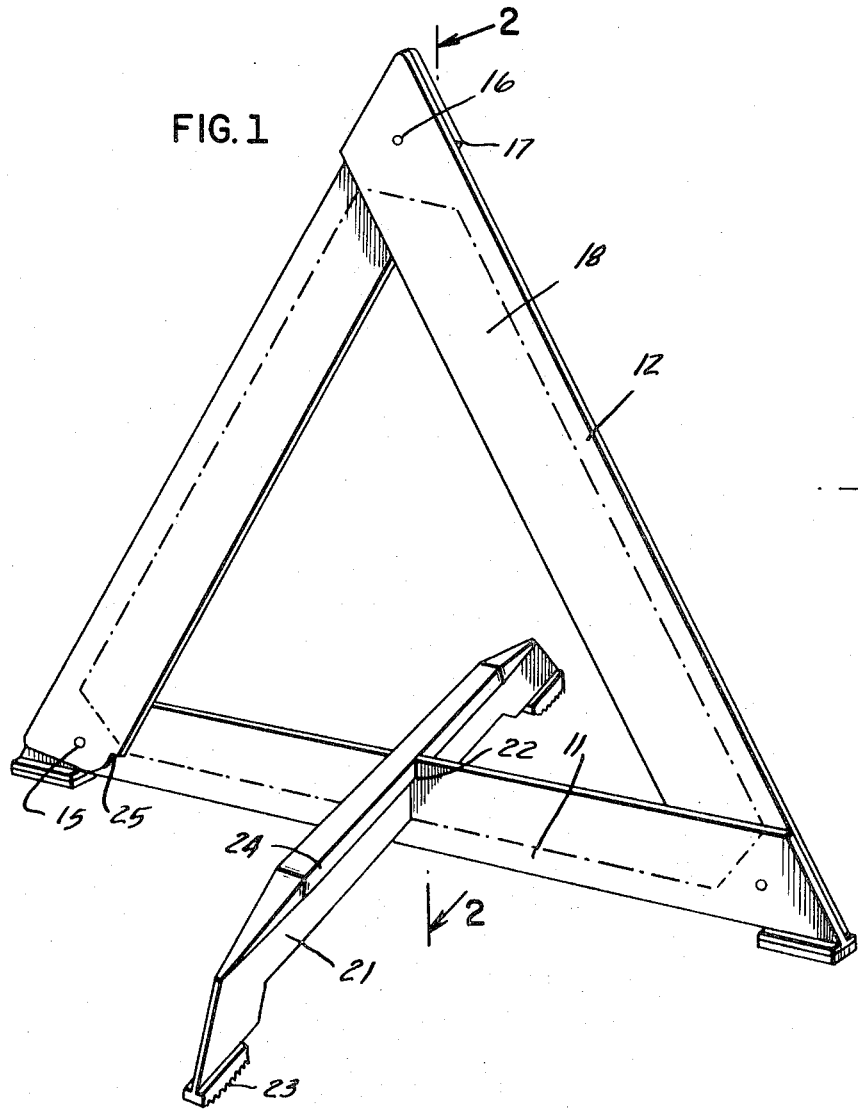
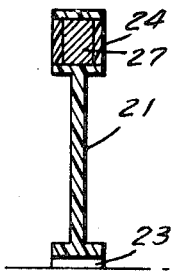
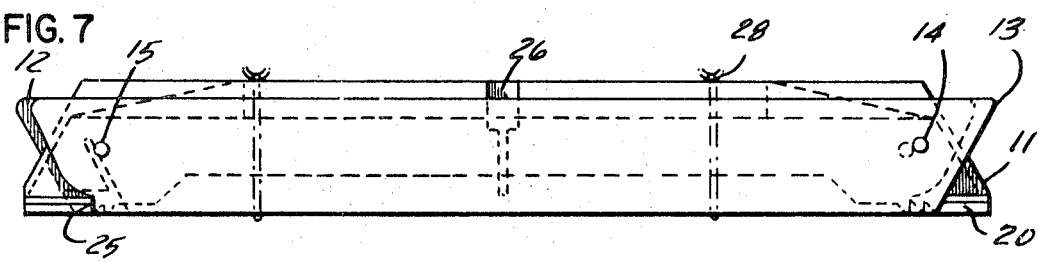

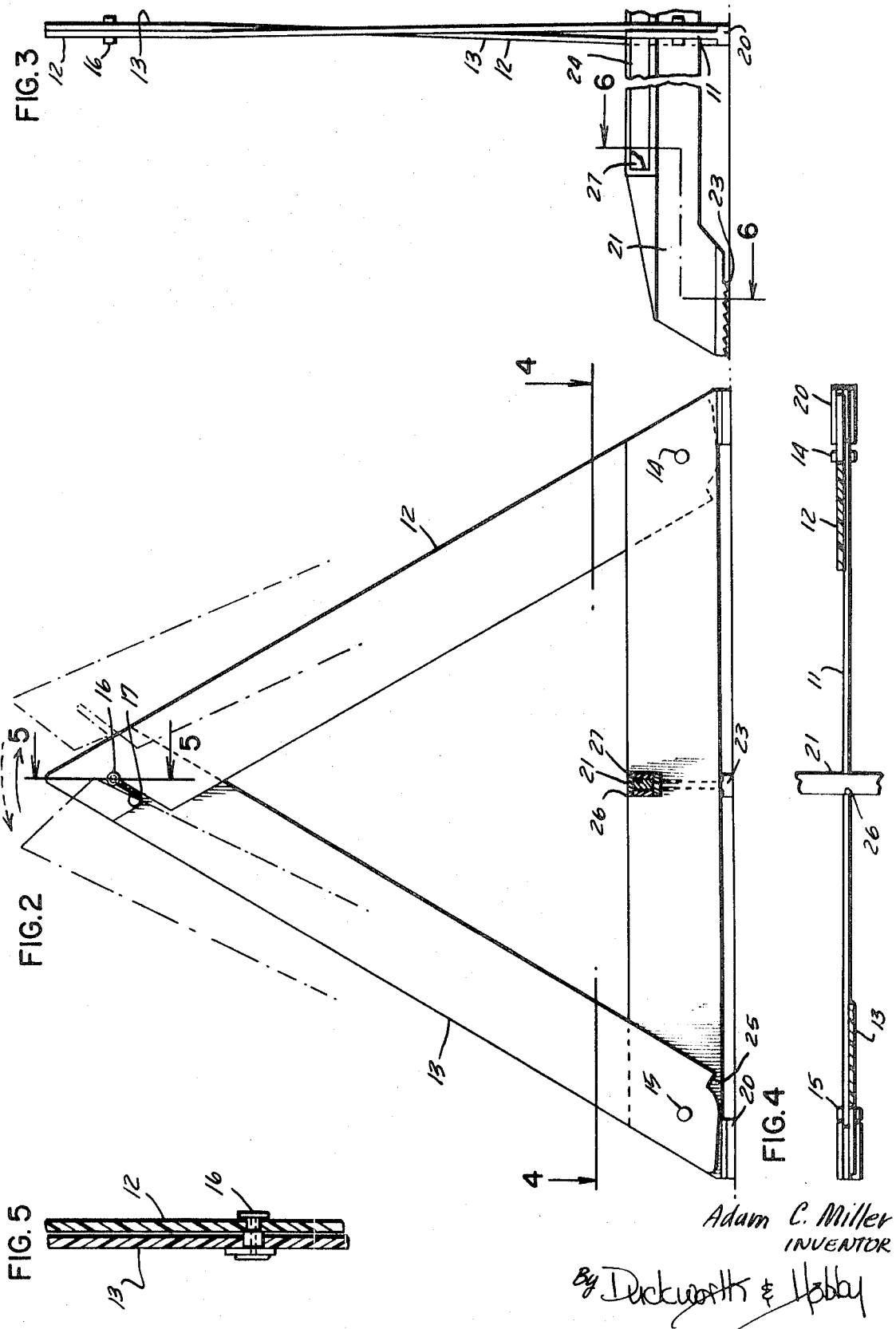

3,625,177

PORTABLE EMERGENCY WARNING APPARATUS

BACKGROUND OF THE INVENTION

The present invention relates generally to warning devices and especially to collapsible emergency traffic markers which can be easily folded for convenient storage in the vehicle and readily assembled as a warning marker for a disabled vehicle, or the like.

In the past a great many safety emergency traffic signals and reflectors have been provided; many of which devices have been of the collapsible or foldable nature and have reflective material on their surface to warn other vehicles in traffic lanes of a disabled vehicle located ahead of them. Such devices are especially important, when, for instance, a vehicle is disabled near the top of a hill or curve were an approaching vehicle would be unable to see the disabled vehicle until it was substantially upon such vehicle.

Accordingly, the Interstate Commerce Commission required motor trucks to carry safety devices and many other bureaus recommend such practice for private automobiles as well. In recent years, it has been urged by many organizations that triangular shaped warning markers be adopted as a uniform warning shape which can be recognized by the general public once such a marker becomes known.

One prior art collapsible emergency traffic marker utilizes a portable triangle having hinged corners removably connecting the sides together and one slotted side for connecting to a pin on another side for folding the triangle. This prior art device as taught in U.S. Pat. 3,135,235 by A. Romano has a rod connected to one side of the triangle extending down to a base having a hollow box for inserting the foldable portions of the warning device.

Other such devices utilize warning lights and movable reflectors to more clearly identify a disabled vehicle. It has also been suggested to combine the highway traffic warning signal with a road map or similar device for carrying in private automobiles or the like.

Other emergency highway warning reflectors have been of the stackable type in which the units may be stacked for portage and easily unstacked for placement along the highway.

Accordingly, one advantage of the present invention is to provide a foldable emergency safety triangle warning device which may be economically manufactured; yet, may be folded to a compact position for carrying in the vehicle, but which may be assembled in a few seconds to a reflective unit of a triangular shape which is sturdy when placed along a highway or the like.

SUMMARY OF THE INVENTION

The present invention relates to a portable emergency warning apparatus having a foldable triangular shaped warning portion in which three elongated sides are connected to form a triangular shape. One of the sides has pivotable connections at each end with one each of the other sides pivotally connected thereto. The other sides also being removably connected to each other. A base member is removably attached to the base side between the ends thereof and both the base side and the base member each have a pair of feet or pads for contact with a surface, such as a highway or the earth along the roadside, whereby the base may be removed, and the triangle folded for storage in one elongated container. The triangular portion is made reflective and the base members may be weighted with the feet serrated or notched to provide greater resistance against being knocked over by wind or the turbulent air of passing vehicles. Similarly, it has been provided to connect each of the sides of the triangle to opposite sides of each other to increase the stability of the triangle, and a means for locating the sides of the triangle in the properly folded position is provided.

BRIEF DESCRIPTION OF THE DRAWING

Other objects, features and advantages of this invention will be apparent from the study of the written description and the drawings in which:

FIG. 1 is a perspective view of one embodiment of the present invention;

FIG. 2 is a sectional view taken along line 2—2 of FIG. 1;

FIG. 3 is a second sectional view of the embodiment of FIGS. 1 and 2;

FIG. 4 is a view taken along line 4—4 of FIG. 2;

FIG. 5 is a sectional view taken along line 5—5 of FIG. 2;

FIG. 6 is a sectional view taken along line 6—6 of FIG. 3; and

FIG. 7 is a view of the embodiment of FIGS. 1 through 6 illustrating the warning device in a folded position.

DESCRIPTION OF THE PREFERRED EMBODIMENT

Referring now to FIG. 1, a triangular-shaped emergency warning device 10 is shown in perspective having a base side or leg 11, a second side 12, and a third side 13. The base side 11 is attached to side 12 by a pivot pin 14 in a pivotal manner, and base side 11 is attached to side 13 at their end portions by a pin 15 in a pivotal manner, and sides 12 and 13 are removably attached to each other by a pin 16 attached to side 12 and by a slot 17 in one end portion of side 13 which slides onto a protruding portion of the pin 16. All sides have a reflective material 18 thereon, which could be painted, or a reflective tape, or molded into the sides. It should also be noted at this point that all sides are connected on opposite sides at each corner, for instance, a side 12 is connected to one side of side 11 and to the other side of side 13, thereby providing some additional rigidity to the foldable triangle 10.

Base side 11 has a pair of feet for pads 20. One such pad being attached to each end of the base leg 11 and being adapted for placement on a surface. A base member 21 is removably attached to side 11 at 22 by both the base 21 and the side 11 being slotted, so that the base member fits over the middle of leg 11 into a slot in a manner that the serrated pads or feet 23 on base member 21 or substantially level with the feet 20 on the side 11 thereby providing four feet for contact with the surface that the warning reflector is placed on. The gripping surfaces on feet 23 are provided to resist a wind force or air turbulence provided by passing cars being applied against the board surface of the sides 12 and 13 from turning the warning device over, and gripping surfaces may also be provided to the pads 20 to provide a similar advantage. Similarly, the base 21 has been weighted at 24 below the center of gravity of the unit to provide additional sturdiness of the unit when placed on the highway or the like. The weighting could similarly be provided in side 11, and could be any ballast material such as lead, iron, or the like. The warning device 10 can be made of plastic which may or may not be reinforced with metal, but the pins 14, 15 and 16 would normally be made of metal such as steel, while pads 20 and 23 may be made of plastic, but could also be made of a resilient material, such as rubber, to provide greater frictional resistance with the surface it is placed on. Sides 12 and 13 have a positioning surface 25 adapted to stop the sides 12 and 13 at the proper location when the triangular portion of the device 10 is being folded, keeping the unit compactly folded for insertion in a case, if desired. Positioning surface 25 is also adapted to prevent the opening of the triangle in an incorrect manner. To fold the unit of FIG. 1 merely requires sliding the base member 21 out of its slot in side 11, and sliding side 13 off of pin 16 and folding the triangle sides 12 and 13 until surfaces 25 contact the feet 20 of the base side 11, and then placing the member 21 beside the folded triangle.

Referring now to FIG. 2, the folding operation of the triangular portion may be more clearly seen with base side 11 having a notch 26 therein and base member 21 located therein and having a weight of ballast 27 therein. Ends 14 and 15 are pivots connecting sides 12 and 13 to side 11 and pin 16 is connected with one end protruding so that slot 17 can slide onto the pin 16 when the triangle is in as assembled position as is illustrated by the dotted lines in this figure showing the two legs 12 and 13 being disconnected from each other. Pads 20 along with the associated folding stop notches 25 can also be seen in this view.

FIG. 3 shows a base member 21 having a weighted portion 27 and serrated feet 23 thereon attached to side 11 of the triangular portion, which triangular portion has sides 12 and 13 extending in an upright position, while side 11 has feet 20 attached thereto.

Referring now to FIG. 4, a sectional view illustrates base leg 11 of the triangular portion with base member 21 attached thereto, and having legs 12 and 13 pivotally attached by pin 14 and 15 along with pads 20 attached to side 11; while FIG. 5 more clearly shows the removable connection between sides 12 and 13 as connected to pin 16.

FIG. 6 shows a sectional view of the base member 21 having a weight 27 located in the enlarged portion 24 thereof, and having feet 23 at each end.

Turning now to FIG. 7, there showing a view of the triangular warning device of the present invention in a folded position for storage and placement in the vehicle or the like when not in use. As can be seen, base leg 11 has pads 20 attached thereto and has a slot 26 therein for insertion of the base member. Sides 12 and 13 have been folded on their pivots 14 and 15 until the surfaces 25 contact the pads 20. The folded unit may then be tied with string 28 or may be slipped in a predesigned casing for storage vehicle.

At this point it will be clear to those skilled in he art that a simple and economical triangular warning device which is collapsible for easy storage in the vehicle has been provided, but it will be clear that other variations are contemplated. This invention is not to be construed as limited to the particular forms disclosed herein, since these are to be regarded as illustrative rather than restrictive.

I claim:

1. A portable emergency warning apparatus comprising in combination: a foldable triangular-shaped warning means having three elongated sides with one side being pivotally connected at each end to each of the other said sides; an elongated base member being removably attached to said one side between the ends thereof and having a pair of serrated feet adapted to contact a surface, said base member having heavy material located therein, said one side also having a pair of feet attached thereto for contact with a surface when said base member feet are in contact with a surface, and being slotted for interconnection with a slotted portion in said base member; whereby said base can be removed and said triangular-shaped warning means folded for compact storage of said warning apparatus; each said other side having a stopping surface for preventing pivoting of said other said sides past a position parallel to said one said side by said stopping surface abutting said feet on said one side; and each said side being movably connected to each other said side and the connection between said other said sides being removably connected by a slot in one engaging a pin protruding from the other, whereby by disconnecting said other said sides from each other and pivoting to a position parallel to said one said side, a compact folded position is accomplished.

* * * * *